(12) United States Patent
Sinclair

(10) Patent No.: US 7,949,687 B1
(45) Date of Patent: May 24, 2011

(54) RELATIONAL DATABASE SYSTEM HAVING OVERLAPPING PARTITIONS

(75) Inventor: Paul L. Sinclair, Manhattan Beach, CA (US)

(73) Assignee: Teradata US, Inc., Dayton, OH (US)

( * ) Notice: Subject to any disclaimer, the term of this patent is extended or adjusted under 35 U.S.C. 154(b) by 618 days.

(21) Appl. No.: 12/105,939

(22) Filed: Apr. 18, 2008

Related U.S. Application Data

(60) Provisional application No. 61/018,331, filed on Dec. 31, 2007.

(51) Int. Cl.
*G06F 17/30* (2006.01)

(52) U.S. Cl. .................. 707/803; 707/758; 707/999.002

(58) Field of Classification Search .................. 707/803
See application file for complete search history.

(56) References Cited

U.S. PATENT DOCUMENTS

| | | | | |
|---|---|---|---|---|
| 6,014,656 A | * | 1/2000 | Hallmark et al. | 1/1 |
| 7,774,379 B2 | * | 8/2010 | Basu et al. | 707/803 |

\* cited by examiner

*Primary Examiner* — Apu M Mofiz
*Assistant Examiner* — Monica M Pyo
(74) *Attorney, Agent, or Firm* — Perkins Coie, LLP

(57) ABSTRACT

In a relational database system, data is logically represented as a single table, but physically stored as a plurality of overlapping partitions. In some embodiments, the table is created by an instruction defining the table's structure and specifying a plurality of partitions in which to store duplicate copies of some data and in some embodiments, the table is accessed without referencing the overlapping partitions.

12 Claims, 5 Drawing Sheets

MinutesTable

| Customer Name | Telephone Number | Voice | Text | Pictures | Video | Downloads | Customer Service |
|---|---|---|---|---|---|---|---|
| Robert | (123)324-1234 | 123 | 114 | 15 | 0 | | 0 |
| Melissa | (123)123-1234 | 23 | 34 | 87 | 234 | | 14 |
| Jennifer | (124)123-2345 | 34 | 123 | 67 | 23 | | 32 |
| William | (321)123-2345 | 0 | 0 | 234 | 22 | | 65 |
| Samantha | (234)234-2445 | 12 | 111 | 16 | 34 | | 12 |
| James | (345)345-3456 | 234 | 178 | 44 | 12 | | 33 |
| Gretchen | (345)345-2345 | 211 | 202 | 54 | 32 | | 12 |
| John | (345)876-2345 | 6 | 15 | 66 | 34 | | 144 |
| Eric | (234)123-1234 | 16 | 14 | 65 | 45 | | 18 |

RELATIONAL DATABASE SYSTEM HAVING OVERLAPPING PARTITIONS

CROSS-REFERENCE TO RELATED APPLICATIONS

This application claims priority to U.S. Provisional Patent Application No. 61/018,331, filed on Dec. 31, 2007, the disclosure of which is hereby incorporated by reference in its entirety.

BACKGROUND

Response time and throughput are common measures used to evaluate the performance of a relational database system. In general, a relational database system's response time is a measure indicating the amount of time that it takes the system to respond to user instructions such as queries, and its throughput is a measure indicating the volume of user activity that the system is able to handle over a period of time. As an illustration of the response time measure, a relational database system that takes a relatively long time to retrieve and output data in response to a user query may be considered to have relatively poor response time and vice versa. As an illustration of the throughput measure, a relational database system that is able to complete only a relatively small number of user queries over a period of time may be considered to have relatively poor throughput and vice versa.

Because modern relational database systems often store massive and complex datasets, the response time and throughput of these systems can vary dramatically based on the way that data is stored, organized, and accessed. For instance, the response time of a relational database system may be unacceptably slow where data is organized such that each query requires the system to scan through vast amounts of non-requested data in order to retrieve requested data, or where data is organized such that each query requires the system to perform several logical operations to join, aggregate, or otherwise manipulate data that is dispersed throughout the system. Similarly, the throughput of a relational database system may be unacceptably low where data is stored and accessed such that successive queries often cause resource conflicts such as memory bus congestion.

In efforts to improve the performance of relational database systems, researchers have proposed a variety of techniques for storing and organizing data such that common queries can be efficiently completed without scanning through volumes of un-requested data or performing costly logical operations such as joins, aggregations, and so on. Examples of some of these techniques include storing related data in independent tables to limit the amount of data that has to be scanned in response to each query, and maintaining frequently accessed data in readily accessible materialized views or join indexes established by a database administrator.

Although many of the proposed techniques provide relatively efficient database performance, these techniques still tend to suffer from a variety of shortcomings such as increased administrative overhead, excessive redundancy of data storage, and some remaining requirement to perform costly logical operations when accessing data.

BRIEF DESCRIPTION OF THE DRAWINGS

FIG. 2 illustrates an example database table storing information regarding customers' day-to-day usage of cell-phone minutes.

DETAILED DESCRIPTION

Figure 1:
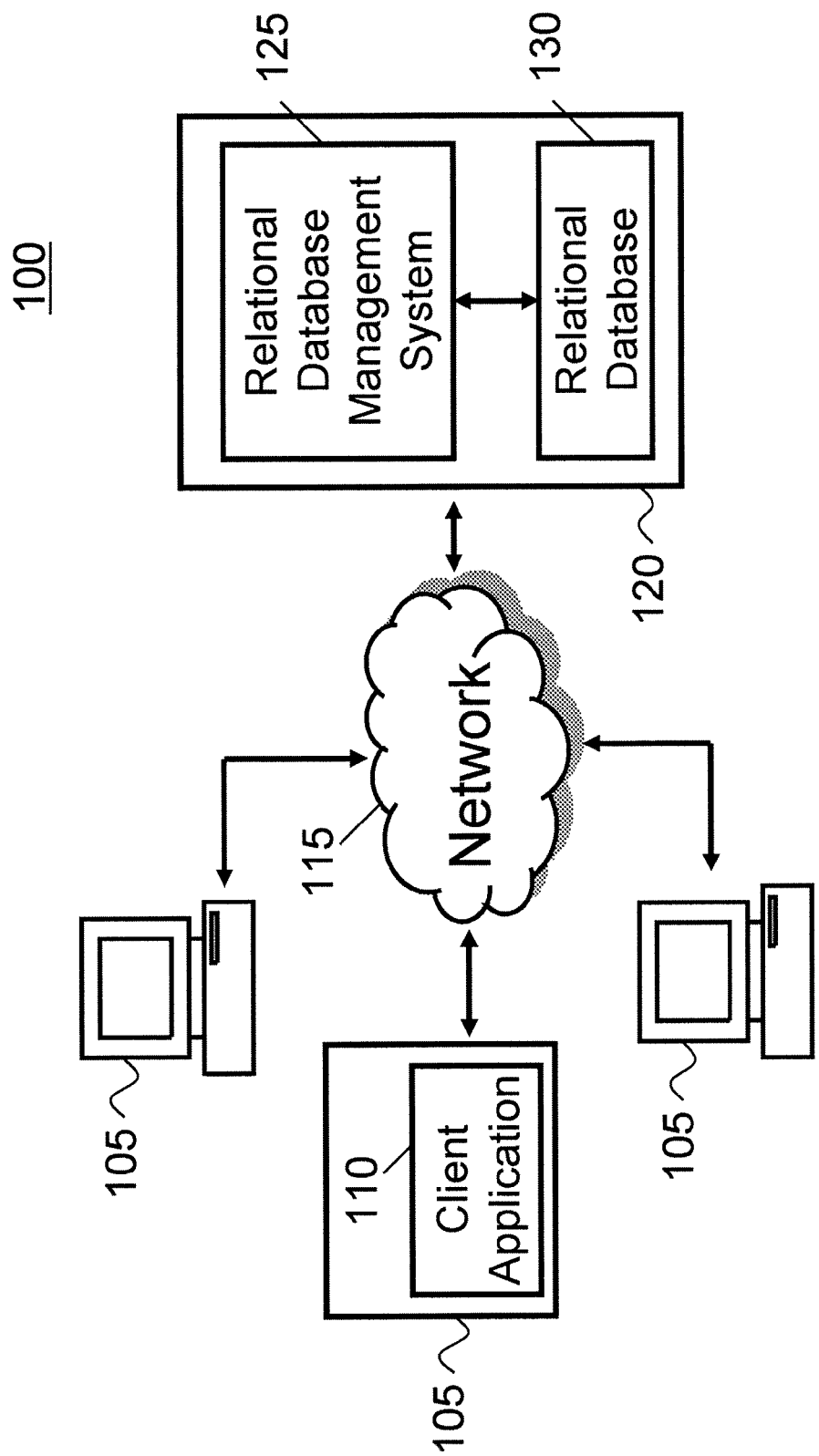
FIG. 1 illustrates an example computing environment in which selected embodiments of the invention may be implemented.

This disclosure presents various techniques and technologies for storing, accessing, and managing data using a relational database system. Within the relational database system, data is logically represented as a single database table, but physically stored as a plurality of partitions possibly having overlapping datasets, i.e., datasets with some mutually redundant portion. Because the plurality of partitions have overlapping datasets, the relational database system stores more than the minimum amount of data required to maintain the database table. However, by storing redundant copies of some data in multiple different partitions, the relational database system may be able to satisfy queries more efficiently than conventional relational database systems.

In this written description, the term "database table", or more simply "table", refers to a logical data structure used to facilitate access to stored data organized in a plurality of logically defined rows and columns. Typically, a table is created by submitting an instruction to a relational database system specifying a logical structure for the table such as a set of named columns to be populated with data. The table is then populated with data by submitting instructions and data to the relational database system, wherein the instructions specify specific logically defined columns or rows of the table into which the data is to be inserted. Data is said to be stored or inserted in a table (or in rows and columns of the table) when the data is stored in physical locations corresponding to the logically defined rows and columns of the table.

To illustrate the general concept of partitions having overlapping datasets, we first note that the term "partition" as used in this written description refers to a physical copy of some portion of a database table. In general, this copy should store information in a retrievable format, but this format may vary from the data's configuration in other copies. For instance, in some examples the data stored in a particular partition may be compressed or processed in a variety of ways. As an example of overlapping partitions, a table comprises ten columns of data C1 through C10, with a first partition PART1 including a stored copy of the data in columns C1 through C6 and a second partition PART2 including a stored copy of the data in columns C5 through C10. Because partitions PART1 and PART2 include duplicate copies of the data in columns C5 and C6, partitions PART1 and PART2 are considered to have overlapping datasets. Within this written description, partitions having overlapping datasets will be referred to as "overlapping partitions".

To illustrate some benefits of organizing data in partitions PART1 and PART2, assume that the users of a relational database system frequently submit queries to access columns C1 through C6 of the above-described table, and the users frequently submit other queries to access columns C5 through C10 of the table. Under these circumstances, it may be advantageous to create partitions PART1 and PART2 each with duplicate copies of columns C5 and C6 in order to allow these frequent queries to access requested data through a single partition and to prevent these queries from being required to scan through unneeded data. In other words, the arrangement of partitions PART1 and PART2 allows queries involving columns C1 through C6 to access all needed data without accessing, comparing, and joining multiple partitions, and without scanning through extra columns such as columns C7 through C10. As a result, the arrangement of partitions PART1 and PART2 tends to decrease the amount of memory bus bandwidth and processor bandwidth required to perform queries in the relational database system.

In general, the data within a partition is not required to reside in a localized or contiguous region of a single data storage resource. Thus, the concept of a partition as used in this written description should not be confused with the dividing of data storage resources such as disk drives into discrete contiguous blocks or units (traditionally referred to as "disk partitioning"). On the contrary, the data within a partition as described herein could be arbitrarily fragmented or distributed across several different data storage resources while still being recognized by a relational database system as a coherent logical unit. Nevertheless, in order to provide a concise and clear illustration of various inventive concepts, several of the disclosed embodiments include simple partitions stored in localized regions of storage resources such as a single disk or memory block.

Additionally, while several of the disclosed embodiments show partitions formed by data from groups of adjacent columns in a table, it should be recognized that a partition can be formed by any arbitrary subset of the data within a table. For example, using the above-described table including columns C1 through C10, a partition could be formed by the even columns C2, C4, ..., C10, or by some combination of column segments and row segments. That said, in view of the logical tools and data organization commonly used in relational database systems, certain types of partitions may be more conveniently used in particular applications. For instance, in applications where adjacent columns tend to be accessed as a group, it may be convenient to organize partitions as groups of adjacent columns or column segments, a technique known as "vertical partitioning". Similarly, in applications where adjacent rows are accessed as a group, it may be convenient to organize partitions as groups of adjacent rows or row segments, a technique known as "horizontal partitioning".

In some embodiments, a table and a corresponding set of overlapping partitions are created or defined through a single database instruction submitted to a relational database system. In general, a database instruction comprises an instruction that is interpreted by database software to generate executable instructions. The single instruction may define, for example, the rows and columns for the table and a distribution of the rows and columns across the overlapping partitions. In one example, the single instruction is an extended version of a "CREATE TABLE" statement provided by the structured query language (SQL).

In some embodiments, the table and corresponding partitions are created, accessed, and updated through a database administrator (DBA) comprising a human operator and/or one or more software agents. The DBA generally creates, accesses, and updates the table by submitting instructions to the relational database system. As an example, these instructions may be submitted in the form of a software script to be interpreted by the relational database system. The script may include, for example, SQL statements such as a "CREATE TABLE" statement for creating the table and partitions, "INSERT" statements for populating the partitions, and "SELECT" statements for retrieving data from the partitions. Often, statements such as "SELECT" statements and other query instructions refer to properties of stored data such as particular ranges or values of the stored data. Accordingly, stored data can be accessed based on particular properties possessed by or associated with the data.

Selected embodiments of the invention will now be described with more particularity in order to illustrate various inventive concepts. These embodiments are presented as teaching examples and should not be construed to limit the scope of the invention as defined by the claims.

FIG. 1 illustrates an example computing environment in which some embodiments of the invention may be implemented. Computing environment 100 is only one example of a suitable computing environment and is not intended to suggest any limitation as to the scope of use or functionality of the embodiments. Neither should the embodiments be interpreted as having any dependency or requirement relating to any one or combination of components illustrated in computing environment 100.

Selected embodiments of the invention may be operational with numerous other general purpose or special purpose computing environments or configurations. Examples of computing systems, environments, and/or configurations that may be suitable for use with these embodiments include, but are not limited to: stand-alone personal computers, server computers, hand-held or laptop devices, programmable consumer electronics, mainframe computers, distributed computing environments that include any of the above systems or devices, and the like. In addition, selected components in the described embodiments may be eliminated or replaced with various alternative components. For example, network components in the illustrated embodiments may be eliminated in favor of direct connections, or the network components may be implemented using any of various available alternative network architectures, protocols, technologies, and configurations. Similarly, software components in the illustrated embodiments may be implemented using any of several available software architectures, languages, and configurations.

Referring to FIG. 1, computing environment 100 comprises a plurality of client computers 105 connected to a relational database system 120 through a network 115. At least one of client computers 105 includes one or more client applications 110 designed to interact with relational database system 120.

Relational database system 120 comprises a relational database 130 and a relational database management system (RDBMS) 125. Relational database 130 typically comprises both data stored in relational database system 120 and information relating to the data's schema, i.e., its physical and logical structure and organization. Alternatively (or additionally), the information relating to the data's schema may be stored in RDBMS 125. RDBMS 125 comprises software and/or hardware used to control storage, access, and management of data in relational database 130. Although not shown, relational database system 120 typically further comprises an operating system, local memory, and other "application hosting resources" used to facilitate the operation of the hardware and software associated with relational database 130 and RDBMS 125.

In typical operation, RDBMS 125 receives instructions input to relational database system 120 and initiates operations on relational database 130 based on the instructions. Relational database system 120 may receive the instructions from any of several different sources. For example, relational database system 120 may receive the instructions directly from client application 110, from a network server in network 115, or from an intermediate software layer in relational database system 120.

The instructions received by RDBMS 125 typically include statements such as "CREATE TABLE" statements for creating a table and corresponding partitions in relational database 130, "SELECT" statements for retrieving data stored in database 130, "INSERT" instructions for populating a table in relational database 130 or updating existing data, and so forth.

One example of an existing relational database system that could be modified to incorporate some of the functionality provided by embodiments of the invention is Teradata© Database 12.0. For example, functions such as the processing of instructions and the creation and management of tables could be performed using Teradata© Database 12.0.

FIG. 2 illustrates an example of a table that could be created using relational database system 120. This table is presented as a simple conceptual illustration to help explain the operation relational database system 120 in accordance with some embodiments.

The table in FIG. 2 is named "MinutesTable" and it includes information regarding customers' day-to-day usage of cell-phone minutes (or more generally, simply cell phone usage). In the table "MinutesTable", the first and second columns include the customers' names and telephone numbers, and the remaining columns include the number of cell-phone minutes (or usage) for voice, text, pictures, video, downloads, and customer service.

For explanation purposes, it will be assumed that the table "MinutesTable" is frequently accessed to analyze usage of a specific type (e.g., voice, text, etc.). Queries for voice and text usage occur much more often than queries for other types of usage. Text usage may be combined and stored together with other types of usage.

In order to facilitate efficient access to the data in the table "MinutesTable", the voice minutes are stored in a first partition P1, the minutes for text are stored in a second partition P2, and the minutes for text and other types of usage are stored in a third partition P3. As a result, data can be collected for the voice minutes by accessing a single partition, data can be collected for text minutes by accessing a single partition, and data can be collected for text minutes and other types of usage can be collected by accessing a single partition. Because the text minutes are stored in both third partition P3 and second partition P2, partitions P2 and P3 constitute overlapping partitions. Although not specifically illustrated, customer name information may be duplicated in all partitions.

In one example embodiment, the table "MinutesTable" is created by submitting a CREATE TABLE statement to relational database 120, where the statement has a syntax such as that shown in Examples 1 and 2 below.

Example 1

CREATE TABLE MinutesTable
    PARTITION CustomerInfo
       (cust_name CHAR(10), cust_phone_num INTEGER, cust_addr
       VARCHAR(120), cust_acct INTEGER, cust_phone_type INTEGER)
    END
    PARTITION P1
       (cust_name, voice INTEGER)
    END
    PARTITION P2
       (cust_name, text INTEGER)
    END
    PARTITION P3
       (cust_name, text, pictures INTEGER, video INTEGER, downloads INTEGER, customer_service INTEGER)
    END
UNIQUE PRIMARY INDEX(cust_name)

Example 2

CREATE TABLE MinutesTable
    (cust_name CHAR(10), cust_phone_num INTEGER, voice INTEGER, text INTEGER, pictures INTEGER, video INTEGER, downloads INTEGER, customer_service INTEGER, cust_addr VARCHAR(120), cust_acct INTEGER, cust_phone_type INTEGER)
    PARTITION CustomerInfo
       (cust_name, cust_phone_num, cust_addr, cust_acct, cust_phone_type)
    END
    PARTITION P1
       (cust_name, voice)
    END
    PARTITION P2
       (cust_name, text)
    END
    PARTITION P3
       (cust_name, text, pictures, video, downloads, customer_service)
    END
UNIQUE PRIMARY INDEX(cust_name)

Figure 5:
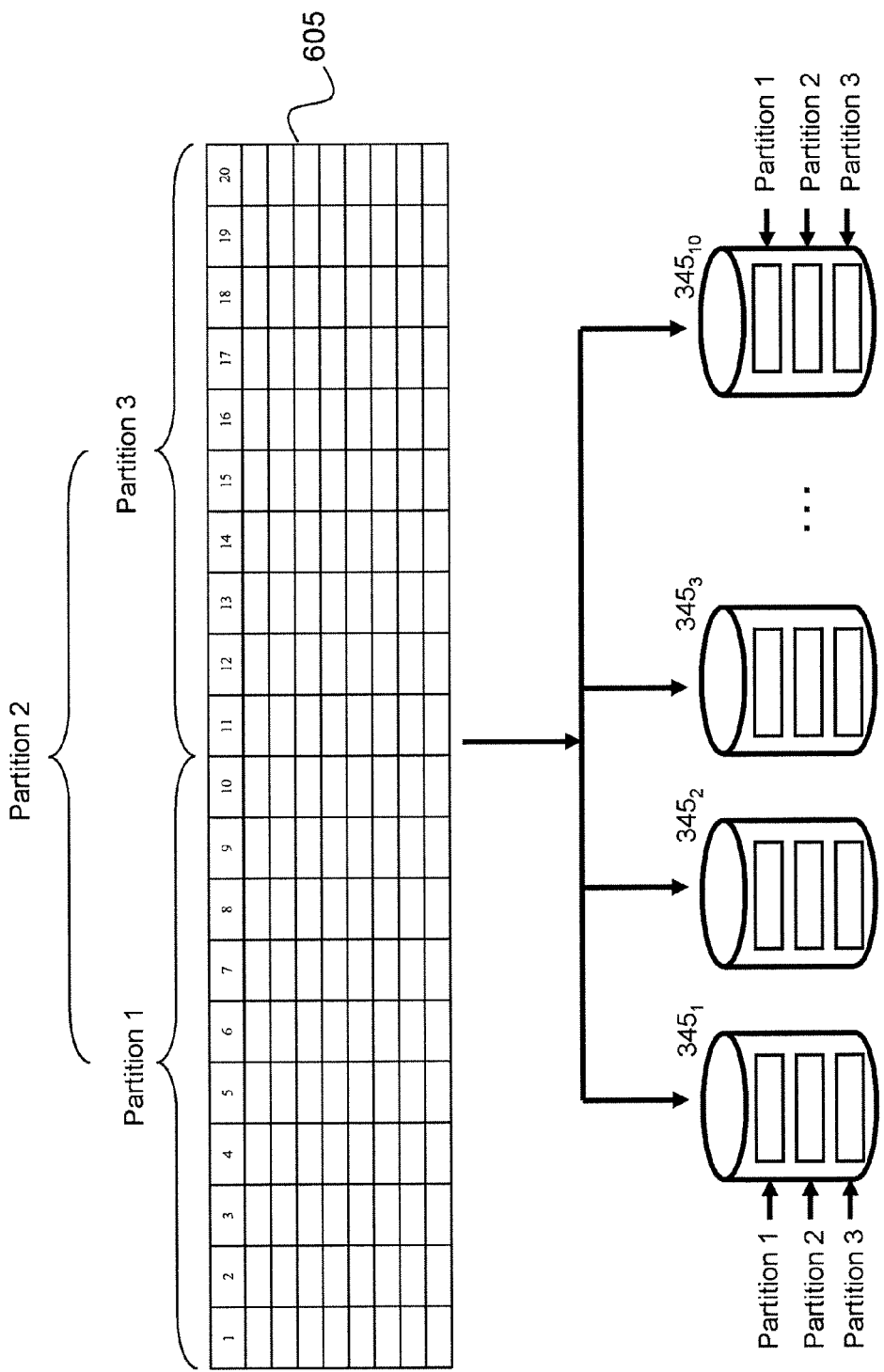
FIG. 5 illustrates the partitioning of an example table across a plurality of data storage resources.

Having created the table "MinutesTable" as described above and illustrated in FIG. 2, relational database system 120 will include four partitions stored in one or more data storage resources, where the fourth partition is formed by data from the "customer name" and "telephone number", and other customer information columns. As an example, a single disk drive could include four separate regions for storing the respective four partitions. Alternatively, as illustrated in FIG. 5, data within each of the partitions could be distributed across different storage resources to facilitate parallel access to data stored in each partition.

The table "MinutesTable" is typically populated with data by submitting database instructions to relational database system 120. For example, the table may be populated by submitting SQL "INSERT INTO" statements to relational database system 120. Similarly, in some embodiments, once the table "MinutesTable" is populated with data, the data can be accessed by submitting database query instructions such as SQL SELECT statements to relational database system 120.

When relational database system 120 receives instructions to populate or access the table "MinutesTable", relational database uses information about defined partitions to control its internal operations such that data is inserted or read in a desired way. For example, when adding data to the table, relational database system 120 may ensure that the data is added to all partitions designated to store the data, and when reading data from the table, relational database 120 may determine from which partition the data is to be read. As an example, where data is to be inserted into the column for text minutes, relational database system 120 typically inserts the data into partitions P2 and P3. Similarly, where data is to be read from the columns for text and video in response to a single query, relational database system 120 typically reads the data from third partition P3 so that the data can be read from a single partition.

Relational database system 120 generally relies on a query optimizer to decide which partition(s) to access in response to a particular query. A query optimizer (or "optimizer" for short) comprises one or more software and/or hardware components adapted to determine how to efficiently respond to a query. This determination is typically made by searching through a list or other data structure including a set of possible actions that could be taken in order to satisfy the query. For instance, it may be possible to satisfy a particular query by accessing any of several different partitions and by performing operations such as joins, selections, and aggregations on any accessed data; hence an optimizer may determine how to respond to a query by choosing a most efficient set of these operations from among several possibilities. Because the amount of time and resources required to satisfy a particular query may vary greatly based on the partitions accessed, the order and nature of operations performed, and the computational resources that are available to assist in the query, an optimizer's performance can have a profound impact on the overall performance of a relational database system.

In general, a query optimizer can take advantage of information regarding overlapping partitions in order to avoid accessing some partitions, and to avoid performing certain operations such as unnecessary joins and aggregations. To provide the optimizer with this information, a system such as relational database system 120 may store a representation of the structure of the partitions (i.e., rows, columns, etc., in each partition) either in a memory such as a local memory of RDBMS 125, or a data dictionary of database 130.

Figure 3:
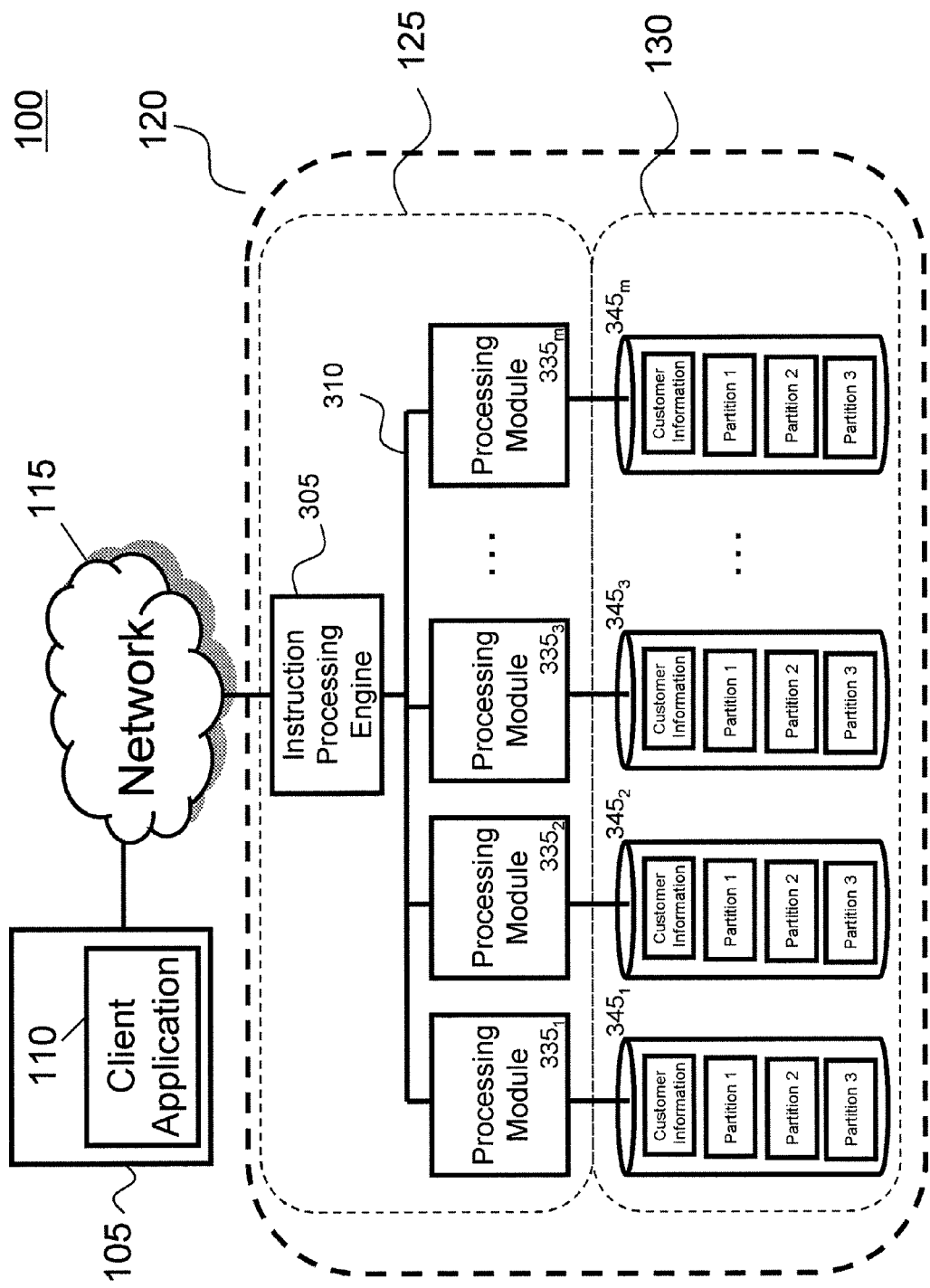
FIG. 3 illustrates an example relational database system having a parallel architecture designed for efficient data storage and retrieval.

FIG. 3 illustrates an example of computing environment 100 in which RDBMS 125 comprises an instruction processing engine 305 and a plurality of processing modules $335_{1 \ldots m}$, and relational database 130 comprises a plurality of data storage resources $345_{1 \ldots m}$ corresponding to processing modules $335_{1 \ldots m}$.

The example of FIG. 3 is presented to illustrate how the data in a table may be beneficially organized across different physical and logical resources to improve the performance of relational database system 120. For instance, the average speed with which relational database system 120 responds to user queries may be improved by storing frequently accessed data in physical storage media having relatively fast response and throughput times, and by storing logically adjacent data (e.g., adjacent columns in the same partition) in physically parallel devices to take advantage of parallel data transfer bandwidth. A variety of different benefits and other potential aspects of the organization of components shown in FIG. 3 can be understood by reference to related and commonly assigned patents including, for example, U.S. Pat. Nos. 7,092,951, 7,203,686, and 7,213,025.

In some embodiments, relational database system 120 includes more processing modules and storage resources than those shown in FIG. 3. In such embodiments, the additional modules and resources may be included in physically or logically separate "database nodes" connected in parallel with processing modules $335_{1 \ldots m}$ through a bus 310. These additional features can be controlled either through instruction processing engine 305 or through another instruction processing engine connected to network 115 in parallel with instruction processing engine 305. In general, the additional features may be implemented using any of several available connection architectures or topologies. For instance, they may be distributed across a relatively complex computing platform such as a multiprocessor system, a distributed network, or a local area network. Notwithstanding the number of possible variations that could be made to the example of FIG. 3, the following discussion will focus mainly on the illustrated features in order to provide a clear and concise explanation.

In the example of FIG. 3, instruction processing engine 305 serves as a logical gateway for processing modules $335_{1 \ldots m}$.

In particular, instruction processing engine 305 receives instructions input to relational database system 120 and processes the instructions by performing operations such as interpretation, syntax checking, semantics checking, data dictionary checking, and query optimization. Upon processing each instruction, instruction processing engine 305 generates executable instructions to be performed by processing modules $335_{1 \ldots m}$ to retrieve, update, and otherwise processes stored data.

Although FIG. 3 shows a strict division between instruction processing engine 305, processing modules $335_{1 \ldots m}$, and data storage resources $345_{1 \ldots m}$, the division of labor between these features may be varied. For example, some instruction processing could be performed by processing modules $335_{1 \ldots m}$ and some instruction execution could be performed by hardware and/or software associated with data storage resources $345_{1 \ldots m}$.

Processing modules $335_{1 \ldots m}$ each typically comprises a processor or a virtual processor. Examples of processing modules $335_{1 \ldots m}$ include access module processors (AMPs) used in Teradata's Active Data Warehousing System. Each of processing modules $335_{1 \ldots m}$ manages data stored in the corresponding data storage resource $345_{1 \ldots m}$ in response to the executable instructions generated by instruction processing engine 305. For example, processing modules $335_{1 \ldots m}$ may perform operations to scan, store, retrieve, and logically process data in storage resources $345_{1 \ldots m}$. Each of data storage resources $345_{1 \ldots m}$ typically comprises one or more disk drives or other physical storage media.

In the example of FIG. 3, each of data storage resources $345_{1 \ldots m}$ stores a plurality of rows of data from a table. This organization of rows can be achieved, for example, by assigning each row to a data storage resource based on a data distribution function defined in instruction processing engine 305. As one example of such a data distribution function, suppose that each row is associated with a first index. Using the example table of FIG. 2, the first index for the rows in partitions P1 through P3 may be the corresponding customer name. By treating these first indices as "keys" for a hash function and by treating each of the data storage resources as a "hash bucket", instruction processing engine 305 can assign each row to a data storage resource using the hash function on the first index as the distribution function for distributing the data. As a simple example, the hash function could hash the customer name so that the customer rows are distributed across data storage resource $345_1$, data storage resource $345_2$, and so on.

Although the above data distribution example uses a relatively simple hash function and indexing scheme, data distribution could alternatively be accomplished through a variety of other, perhaps more complicated, indexing schemes and/or distribution functions. For instance, the distribution function could distribute data to different storage resources based on index ranges, a list of indices, or some predetermined mapping between indices and data storage resources. In a similar vein, the organization of data within partitions on data storage resources $345_{1 \ldots m}$ can also be accomplished, for example, through a variety of different partition indexing schemes and/or distribution functions.

Figure 4:
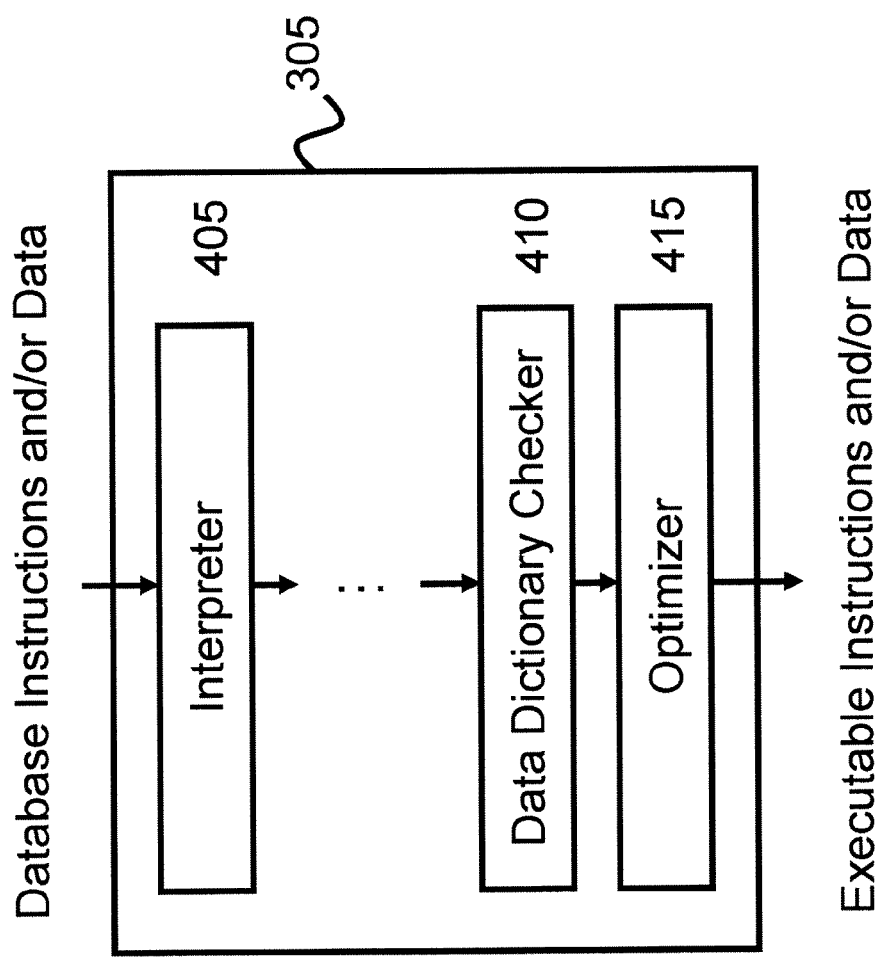
FIG. 4 illustrates an example instruction processing engine for a relational database management system.

FIG. 4 is a conceptual illustration showing an example of instruction processing engine 305. In the example of FIG. 4, instruction processing engine 305 comprises several software modules including an interpreter 405, a data dictionary checker 410, and an optimizer 415. As indicated by the ellipsis in FIG. 4, instruction processing engine 305 may include additional modules not shown such as specific syntax and semantics checking components.

Interpreter 405 receives and interprets instructions and/or data input to relational database system 120. After an instruction has been interpreted, data dictionary checker 410 inspects a data dictionary to identify the logical structure and organization of resources that may need to be accessed in response to the instruction. For instance, where the instruction is a query instruction, data dictionary checker 410 may consult the data dictionary to identify the potential locations for data needed to satisfy the query. Assuming that all of the necessary components exist for carrying out the instruction, optimizer 415 determines a plan for carrying out the instruction. Then, based on the plan, executable instructions are generated and transmitted to a dispatcher or other instruction execution software or hardware to carry out the instruction.

Where the instruction identifies portions of a database table that reside in multiple overlapping partitions, the optimizer may be required to determine which partitions to access in order to efficiently carry out the instruction. Typically, the optimizer can make this determination by accessing stored information regarding the structure of any relevant partitions. As described above, this information may be stored, for example, in a local memory of RDBMS 125 or in a data dictionary of relational database 130. In addition to (or as an alternative to) storing information regarding the structure of partitions in a local memory of RDBMS 125 or in a data dictionary of relational database 130, the structure of partitions and the relationship between partitions can be implicitly defined by data within the partitions themselves. For instance, relationships between row segments in different partitions can be reflected by row identifiers stored in each row segment.

FIG. 5 is a conceptual illustration showing the partitioning of an example table 605 across data storage resources $345_1 \ldots m$. This illustration is provided to show one way that the parallelism of relational database 130 shown in FIG. 3 can be used to provide efficient access to stored data partitions. In the example of FIG. 5, three partitions each comprising ten columns of data are stored in ten data storage resources $345_1 \ldots m$. The rows in each partition can be accessed and processed in parallel to provide relatively efficient performance for operations on a single partition.

Specific techniques and technologies presented in this disclosure can be used to improve both the throughput and response time of a relational database system. These improvements can be accomplished, for example, by storing data in overlapping partitions to reduce the number of partitions accessed in some queries and to reduce the number of logical operations required to join, aggregate, and otherwise process data for some queries. In addition, certain aspects of these techniques and technologies can reduce the amount of administrative overhead required to organize, maintain, and access stored data in a relational database system. For instance, various embodiments allow database administrators to create and access a database table including overlapping partitions using relatively simple instructions such as a single table creation instruction capable of generating multiple overlapping partitions, and data input instructions and query instructions capable of inputting and accessing data into multiple overlapping partitions without referring specifically to the overlapping partitions.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of accessing data in a relational database system, comprising:
   receiving an instruction identifying a portion of a database table stored in the relational database system, wherein the portion includes a plurality of data elements, and a copy of one or more data elements of the portion is stored in each of a plurality of overlapping partitions within the relational database system, each partition among the plurality of overlapping partitions including a copy of one or more of the same columns or column segments of the database table, the plurality of overlapping partitions being created by the relational database system in response to an instruction identifying a set of columns to be included in the database table and specifying one or more columns to be included in multiple partitions; and
   in response to the instruction, identifying the plurality of overlapping partitions and reading the portion of the database table by accessing only a subset of the plurality of partitions, the subset of the plurality of overlapping partitions being chosen from among the plurality of overlapping partitions based on a determination of query efficiency made by a query optimizer.

2. The method of claim 1, wherein each partition among the plurality of overlapping partitions includes a copy of one or more of the same rows or row segments of the database table.

3. The method of claim 1, wherein the plurality of partitions are identified by accessing information stored in a local memory of a relational database management system within the relational database system.

4. The method of claim 1, wherein the relational database system comprises a plurality of data storage resources connected in parallel to a relational database management system, and wherein the portion of the database table is read by accessing one or more of the plurality of data storage resources.

5. The method of claim 1, wherein the instruction identifying a portion of a database table stored in the relational database system does not explicitly refer to any of the plurality of overlapping partitions.

6. A method of operating a relational database system, comprising:
   receiving a table creation instruction, the table creation instruction specifying a structure for a database table stored in the relational database system and identifying one or more portions of the database table to be stored in each of a plurality of overlapping partitions;
   in response to the table creation instruction, creating the database table by generating the overlapping partitions and by generating a data structure identifying the structure of the database table and a correspondence between rows and columns of the database table and the plurality of overlapping partitions;
   receiving a data input instruction including input data and indicating one or more row or column segments of the database table in which to store the input data; and
   in response to the data input instruction, storing the input data in each of the plurality of overlapping partitions, wherein each of the plurality of overlapping partitions includes the row or column segments;
   receiving a query instruction identifying a portion of the database table from which to read data, wherein at least part of the portion is stored in each of multiple partitions among the plurality of overlapping partitions; and
   in response to the query instruction, identifying the multiple partitions and reading the portion of the database table by accessing only a subset of the multiple partitions, the multiple partitions being chosen from among the plurality of overlapping partitions based on a determination of query efficiency made by a query optimizer.

7. The method of claim 6, wherein the relational database system comprises a plurality of data storage resources connected in parallel to a relational database management system, and wherein the plurality of overlapping partitions are stored among the plurality of data storage resources.

8. The method of claim 7, wherein at least one of the plurality of overlapping partitions is stored across multiple data storage resources.

9. A relational database system, comprising:
a data storage resource,
a database table, stored within the data storage resource, comprising a plurality of logically defined rows and columns;
a plurality of overlapping partitions adapted to store data corresponding to the plurality of rows and columns, wherein data corresponding to each of multiple rows or row segments and/or multiple columns or column segments is stored in each of multiple partitions among the plurality of overlapping partitions, each partition among the plurality of overlapping partitions including a copy of one or more of the same columns or column segments of the database table, the plurality of overlapping partitions being created by the relational database system in response to an instruction identifying the plurality of logically defined rows and columns and indicating the multiple rows or row segments and/or multiple columns or column segments for which data is to be stored in each of the multiple partitions among the plurality of overlapping partitions;
a relational database management system adapted to receive a database instruction identifying a portion of the database table, wherein at least part of the portion is stored in each of multiple partitions among the plurality of overlapping partitions and further adapted to generate one or more executable instructions for reading from said data storage resource the portion of the database table by accessing only a subset of the plurality of partitions; and
a query optimizer adapted to identify a subset of the overlapping partitions to access in response to a query instruction based on an estimation of query efficiency.

10. The relational database system of claim 9, wherein the one or more executable instructions are executed by one or more processing modules each corresponding to a different data storage resource connected to the relational database management system in parallel.

11. The relational database system of claim 10, wherein at least one of the one or more processing modules comprises a virtual microprocessor.

12. The method of claim 9, wherein each partition among the plurality of overlapping partitions includes a copy of one or more of the same rows or row segments of the database table.

\* \* \* \* \*